United States Patent [19]

Alexander

[11] Patent Number: 5,547,583

[45] Date of Patent: Aug. 20, 1996

[54] METHOD FOR SEPARATING CONTAMINANTS FROM SOLUTION EMPLOYING AN ORGANIC-STABILIZED METAL-HYDROXY GEL

[76] Inventor: Donald H. Alexander, 212 High Meadows, Richland, Wash. 99352

[21] Appl. No.: 350,183

[22] Filed: Nov. 30, 1994

[51] Int. Cl.[6] ............................................ C02F 1/42
[52] U.S. Cl. ...................... 210/666; 210/667; 210/670; 210/682; 210/688; 210/691; 210/711; 210/728; 210/908; 210/912; 210/913
[58] Field of Search .................... 210/660, 670, 210/671, 676, 716, 717, 682, 691, 908, 681, 688, 912, 913, 666, 667, 711, 728

[56] References Cited

U.S. PATENT DOCUMENTS

| | | | |
|---|---|---|---|
| 3,298,960 | 1/1967 | Pitzer | 588/14 |
| 3,860,532 | 1/1975 | Takase et al. | 502/235 |
| 3,974,070 | 8/1976 | Popov et al. | 210/717 |
| 4,144,355 | 3/1979 | Rawlings et al. | 210/717 |
| 4,207,184 | 6/1980 | Kaiser et al. | 210/681 |
| 4,238,328 | 12/1980 | Bowes et al. | 210/688 |
| 4,279,756 | 7/1981 | Weiss et al. | 210/667 |
| 4,379,763 | 4/1983 | Clemens et al. | 210/682 |
| 4,717,554 | 1/1988 | Nomura et al. | 210/670 |
| 5,223,144 | 6/1993 | Woyciestes et al. | 210/688 |
| 5,336,704 | 8/1994 | Rainer | 210/681 |
| 5,370,827 | 12/1994 | Grant et al. | 210/682 |
| 5,384,036 | 1/1995 | Fyson | 210/912 |

*Primary Examiner*—Peter A. Hruskoci
*Assistant Examiner*—Theodore M. Green
*Attorney, Agent, or Firm*—Edward V. Hiskes; Robert Southworth; William R. Moser

[57] ABSTRACT

Metals and organics are extracted from solution by co-precipitating them with a gel comprising aluminum hydroxide and a complexing agent such as EDTA. After the gel is processed to remove the metals and organics, it can be recycled for further use by dissolving it in a high-pH solution, leaving no secondary waste stream. A number of alternative complexing agents perform better than EDTA.

5 Claims, 2 Drawing Sheets

METHOD FOR SEPARATING CONTAMINANTS FROM SOLUTION EMPLOYING AN ORGANIC-STABILIZED METAL-HYDROXY GEL

This invention was made by an employee of the U.S. Department of Energy. The Government has certain rights in this invention.

BACKGROUND OF THE INVENTION

The current invention relates to a process for removing undesired components from waste materials. More specifically, the present invention presents a method for removing metallic and organic materials from basic aqueous solutions by means of co-precipitation with a stabilized gel, typically comprising aluminum hydroxide and a complexing agent such as EDTA.

Contamination resulting from diverse industries including manufacturing, power generation, mineral extraction, and nuclear weapons production operations has resulted in extensive environmental impacts to facilities and their surrounding environments. Contaminants include heavy metals, organics, and radionuclides occurring individually or as mixed waste. A need exists for means to recover these contaminants while assuring waste minimization.

Contaminants are often bound to surface substrates in pipes and reaction vessels or on the surface of soils and in groundwater. Soil and groundwater treatment often involves pump and treat methods or direct soil extraction and washing. Contaminants of concern in soils are bound to soil particle surfaces and can often be removed by solvent extraction.

Existing contaminant recovery processes typically use acid wash techniques which cause corrosion of metallic components, especially iron, when used for decontaminating facility piping. Moreover, acid wash is hampered in its application to soils because it quickly becomes saturated with carbonates, sulfates, and to a lesser extent, other common soil anions.

Existing extraction techniques typically use adsorbant or absorbant solids which bind metal ions on their surfaces or in their structures. For example, zeolites and charcoal filters are used to absorb radionuclides. In facility decontamination processes, organic reagents are commonly used to dissolve contaminants. The reagents in decontamination processes are typically used to deposit the contaminants on ion exchange resins. However, in any of these processes, the absorbing solids themselves become waste.

Contaminated waste solutions containing high concentrations of heavy metals or radionuclides and chelating agents such as EDTA are typically generated during the process of decontaminating metal surfaces or through soil washing. A number of methods have been previously described for treatment and disposal of these solutions.

Typically, hazardous components are recovered as solids from non-hazardous components. The solid components including radionuclides are sent to landfills with special restrictions for final disposal. Waste disposal restrictions are also placed on chelating agents such as EDTA because they can keep heavy metals or radionuclides in solution and enable them to migrate to drinking water supplies. Therefore, limits are often placed on disposal of chelants in disposal sites.

Therefore, a number of methods have been utilized which involve the separation of the chelating agent from the metals. Once separated, the contaminated chelating agent is either subjected to volume reduction techniques or destroyed. Destruction techniques include oxidation (e.g., ozone or permanganate), pyrolysis, electrolytic decomposition and others.

Volume reduction is subject to processing costs and disposal fees. Other methods typically require expensive equipment or tend to take long processing times such as ozonation.

In the prior art, metal hydroxides such as aluminum hydroxide form gels which are utilized in laboratories to scavenge contaminants. However, the hydroxide gels which form typically convert to a range of crystalline forms which precipitate. These crystalline precipitates are difficult to dissolve. The invention provides a phase transition gel, that is, a gel that can be readily dissolved and reprecipitated by simple pH adjustment.

SUMMARY OF THE INVENTION

The principle object of this invention it to provide a way to extract undesired organic and metallic constituents from basic solutions.

A further object of this invention is to provide extraction means which do not generate a secondary waste stream, as do alternative extraction techniques which employ polymers, resins or zeolites.

A further object of this invention is to provide an extraction means which is compatible with caustic wash solutions, as opposed to the acid washes now commonly applied in facility decontamination and soil washing application.

The foregoing objects are achieved in accordance with the present invention by co-precipitation of a metal hydroxide with a complexing agent to form an amorphous gel. Undesired metallic or organic constituents in solution adhere to the gel and are thus concentrated into the precipitated gel. The gel and contaminants may then be separated from the bulk of the solution to be subjected to further recycling or cleaning.

DETAILED DESCRIPTION OF THE PREFERRED EMBODIMENT

Figure 1:
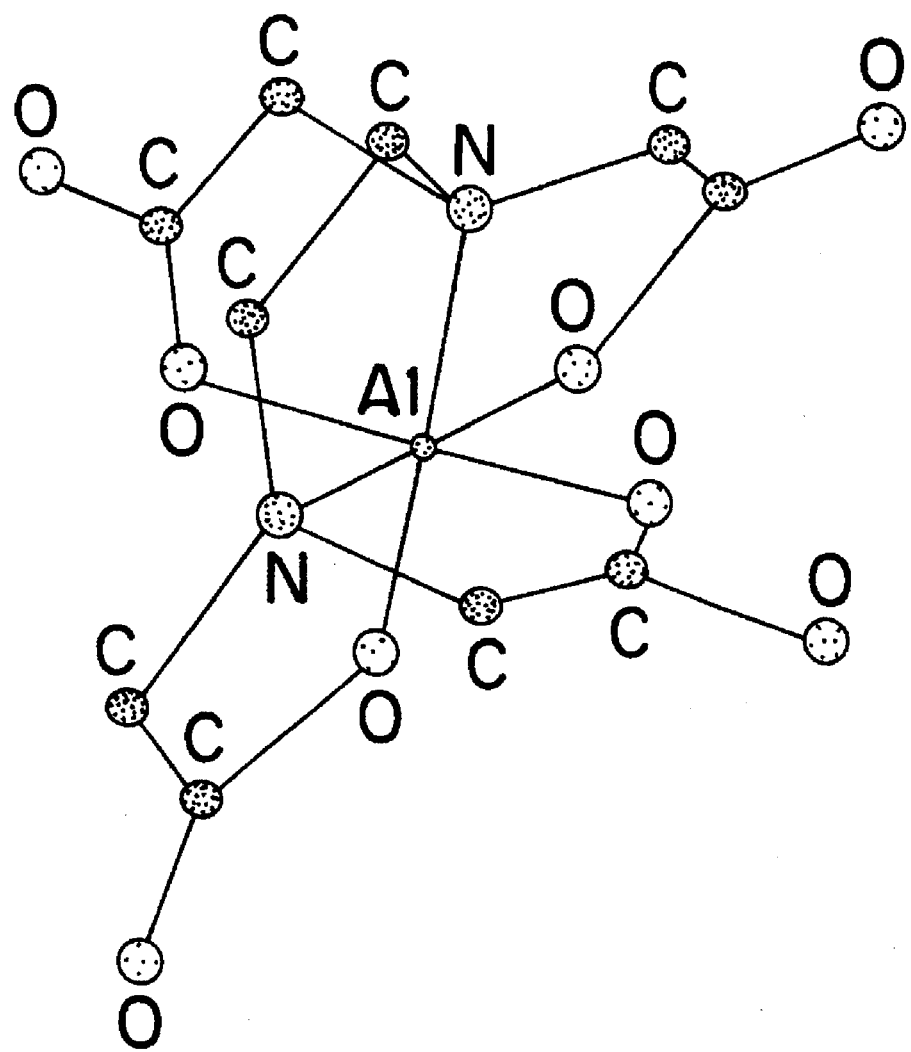
FIG. 1 is a diagram of an EDTA-Al gel of the type which may be employed with the present invention.

This invention permits radionuclides, heavy metals, and organics to be extracted from solution by scavenging them with an amorphous gel. In the preferred embodiment, a contaminated solution (e.g. from soil washing, decontamination, or groundwater pumping) is transferred to a reaction vessel and maintained above the carbonate-bicarbonate boundary (greater than pH 11). The contaminated solution (e.g. from a wash process) is contacted by the sequestering reagent which might contain for example, aluminate and EDTA anions in a 2.5M NaOH solution. The pH of the solution is lowered on contact with the contaminated solution, or for example by bubbling it through with carbon dioxide, causing an aluminum hydroxide gel to precipitate as the solution drops below the range of 1.8 to 2.5 molar NaOH (less than pH 14). This precipitating gel scavenges waste contaminants as it settles through solution leaving a clean supernatant which is then separated from the gel residue by centrifugation, simple settling, or other means. The gel residue containing concentrated contaminants is then redissolved releasing contaminants for separations and processing. This is a critical point: the stabilized gel used in this invention is readily re-dissolved by merely increasing the pH above the gels phase transition to aqueous anions. Thus, concentrated contaminants trapped in the gel can be released for convenient separation from the sequestering reagent, and said reagent can then be recycled.

Target contaminants suitable for concentration into the gel used with this process include: radionuclides such as actinides, transuranics, and some fission products (e.g., Tc); organics such as aldehydes, ketones, phenols, aromatic nitro compounds, carboxylic acids, and amino compounds; and heavy metals such as those found in amphiprotic hydroxides and their anions (principally of Zn, Al, Cr, Pb, Sn, As, Sb, Cu, and Co). Other metals such as V, Se, Te, Cs, and to a lesser extent Cd, Mn, Ni, and Fe can also be extracted by the gel.

For use in defining this process it is convenient to define the term "sequestering reagent". The sequestering reagent used herein, is a mixture of a gel-forming compound and a gel-stabilizing compound, which acts to prevent the gel-forming compound from precipitating out in a crystalline form as pH is changed. One suitable gel-forming compound for use with this invention is aluminum hydroxide. A suitable gel-stabilizing compound for use with aluminum hydroxide is EDTA. Preferably, the sequestering reagent also contains enough dissolved NaOH or similar pH adjusting compound to maintain the pH above 11. One suitable molar ratio of EDTA to aluminum hydroxide is 1:1, which value is selected on the theory that one EDTA molecule will associate with one aluminum atom, thus blocking the bonding of aluminum hydroxide molecules to one another, and thereby inhibiting crystallization.

In place of Al in the aluminum hydroxide gel-former, any of the following hydroxides, formed from congeners of Al, might be used: aluminum hydroxide; scandium hydroxide; yttrium hydroxide; lanthanum hydroxide; gallium hydroxide; indium hydroxide; and thallium hydroxide.

In place of EDTA as a gel-stabilizing agent the following would operate in the caustic environments in which this invention operates: amines, nitrogen heterocyclics, amides, hydroxyl amines, pyridazine, dialkyl amido complexes, hydrazines, pyrimidine, nitrene complexes, amino carboxylic acids, purine, nitrido complexes, amino phenols, pyrazene, and substituted ureas, azo complexes, diazene complexes, urea, thiourea; and the phosphorous and other Group V cogeners of the foregoing.

BACKGROUND CHEMISTRY

The absorption of carbon dioxide by strong alkaline solutions is a well understood phenomenon. Extensive work has been done in this area, dealing with carbon dioxide intake in high level radioactive waste tanks at Savannah River. Experiments conducted for this patent on carbon dioxide absorption by $NaAlO_2/NaOH$ only reaffirm these findings. These reactions can be visualized as:

$$2NaOH + CO_2 \rightarrow Na_2CO_3 + H_2O \tag{1}$$

The precipitation of carbonates ultimately depletes NaOH in caustic solutions. The depletion of NaOH by carbon dioxide, in turn, lowers the available hydroxyl ions (lowering pH) and affects other chemical equilibria in the solution.

During a second set of experiments the decrease in hydroxyl ion concentration due to carbon dioxide absorption converts the aluminate ion to an amorphous form of aluminum hydroxide which in turn rapidly converts to the crystalline form, gibbsite.

$$\underset{\text{solution}}{NaAlO_2} + 2H_2O \dashrightarrow NaOH + \underset{\text{crystalline}}{Al(OH)_3} \tag{2}$$

Combining equations (1) and (2) gives equation (3) and is essentially the replacement of a weaker Lewis acid $Al(OH)_3$ by a stronger acid, $CO_2$:

$$2NaAlO_2 + CO_2 + 3H_2O \rightarrow Na_2CO_3 + 2Al(OH)_3 \tag{3}$$

and;

$$\underset{\text{amorphous}}{Al(OH)_3} \dashrightarrow \underset{\text{crystalline}}{Al(OH)_3} \tag{4}$$

The rapid conversion of the amorphous form to the crystalline form limits the utility of gibbsite as a binding agent. However, it was thought that the presence of chelating agents might stabilize the amorphous (gel) form of aluminum hydroxide under highly alkaline conditions. Through a series of experiments it was determined that the presence of organic compounds such as EDTA, HEDTA, valine, glycine, and surfactants in highly alkaline solutions do stabilize the amorphous aluminum hydroxide by complexation:

$$Al(OH)_3 + \underset{\text{agent}}{\text{complexing}} \dashrightarrow \underset{\substack{\text{complex} \\ \text{amorphous gel}}}{\text{organo-aluminum hydroxide}} \tag{5}$$

The stability of the organo-aluminum hydroxide complex gel in highly alkaline solutions allows it to serve as the binding agent for a variety of precipitates including sodium nitrite, sodium nitrate, aluminates, carbonates, and metal hydroxides and oxyhydroxides. The complex exhibits the typical properties of gels including high viscosity and thixotropism which are essential properties of a binding agent. FIG. 1 shows an aluminum-EDTA complex.

Experiments demonstrate that organic complexants react with the aluminum hydroxide and expand its stability field. A series of organo-aluminum hydroxide gel species are stable at higher hydroxide concentrations than the inorganic system. We define stabilities up to 2.5M. Additional experimental results confirm that the organo-aluminum hydroxide complex gel solubility is readily reversible at NaOH concentrations near 2.2 molar:

$$\underset{\text{gel}}{\text{organo-aluminum hydroxide complex}} \underset{>2.2M/l}{\overset{NaOH}{\dashleftarrow\dashrightarrow}} NaAlO_2 + \text{complexing agent} + \text{water} \tag{6}$$

Figure 2:
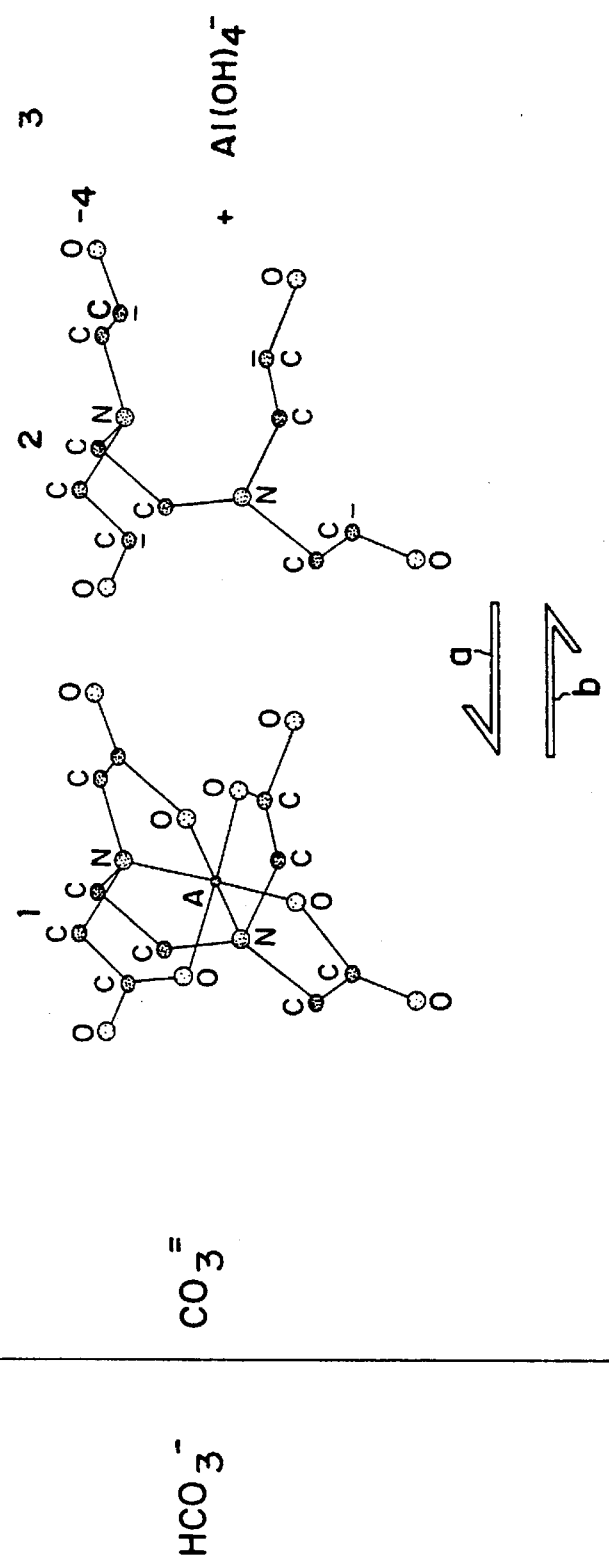
FIG. 2 is a diagram which indicates the pH conditions under which gel may be formed or dissolved in accordance with the present invention.

Equation 6 illustrates the basis of the present invention. The reactant (left side of reaction) in equation 6 is an example of a sequestering reagent. The conceptual phase relationships of equation 6 are illustrated in FIG. 2. A sequestering reagent (also referred to as an Alexander Sequestering Reagent) is defined is a composition comprising a metal hydroxide or oxy-hydroxide and an organic stabilizing agent, which, together, co-precipitate to form an amorphous gel.

A "wash reagent" (also referred to an Alexander Wash Reagent) comprises an organic compound, usually a nitrogen-containing organic such as urea; together with a caustic agent such as sodium peroxide.

REMOVAL OF CONTAMINANTS FROM SOLUTIONS

This invention is a separation process for the recovery of contaminants especially from highly caustic hydroxide solutions (>pH 11). The source of the solutions to be cleaned by the process may be from a wide range of contaminant recovery processes. The contaminant bearing solutions may be recovered from diverse sources such as soil washing, contaminated groundwaters, and decontamination wash solutions. The contaminant bearing solutions may also be from processing stages of liquid high level waste treatment streams. Target contaminants include: radionuclides, especially actinides, transuranics, and some fission products (e.g., Tc); processing organics such as aldehydes, ketones, phenols, aromatic nitro compounds, carboxylic acids, and amino compounds; and heavy metals, especially amphiprotic hydroxides and their anions (principally of Zn, Al, Cr, Pb, Sn, As, Sb, Co, and Cu).

The contaminated wash solution (e.g. from soil washing, decontamination, or groundwater pumping) is transferred to a reaction vessel and maintained above the carbonate-bicarbonate boundary (greater than pH 11 for the preferred embodiment). The sequestering reagents including the selected polydentate nitrogen bearing complexing agents and selected metal hydroxide or oxyhydroxide are stabilized as dissolved species in a NaOH solution (greater than 2.2 molar). The metal hydroxide might be of aluminum or one of its cogeners from Group III (scandium, yttrium, lanthanum, and lanthanons) or Group IIIb (gallium, indium, or thallium). The complexing agent may be selected from analogous compounds where Group V cogeners of nitrogen, especially phosphorous compounds are substituted. The active species in the sequestering reagent solution co-precipitate as a gel between 1.8 to 2.5 molar NaOH but with typical transitions at STP of 2.2 molar NaOH. Therefore, as the sequestering reagent is added to the filtered wash solution, its pH crosses the phase boundary resulting in its co-precipitation as a gel, as is illustrated in FIG. 2. The gel scavenges waste contaminants as it settles through solution leaving a clean supernatant which is separated from the gel residue. The gel residue which concentrates the contaminants is then redissolved releasing contaminants for separations and processing. The process is adapted for soil remediation, groundwater clean-up, and decontamination.

Assuming that in the foregoing that aluminum hydroxide, EDTA, and NaOH sequestering reagent are to be used, one method of practicing this invention is to pour the high-pH sequestering reagent into a lower-pH receiving solution, which receiving solution contains the target contaminants. Upon contacting and partially mixing with the lower-pH receiving solution, aluminum hydroxide gel begins to precipitate, and contaminants in the lower-pH solution become attached to the precipitating gel. This process can be summarized as comprising the following steps:

1) a contaminated receiving solution is adjusted, where necessary to further stabilize the gel, typically at a pH between 11 and 14;

2) the sequestering reagent is added, typically in dissolved form;

3) upon contact with the receiving solution the reagent co-precipitates as a gel;

4) once formed, the gel either settles through the influent solution due to gravity or is forced rapidly through the solution by techniques such as centrifugation or electromagnetics and the gel reagent sequesters contaminants as it passes through the solution;

5) clean supernatant is separated from the gel and can be returned for another cycle, taken from the system, or used elsewhere in the wash cycles;

6) the gel is then redissolved and the solution subjected to conventional processing to separate its components; and 7) EDTA, NaOH, and aluminum hydroxide recovered from step 6 are recycled for re-use as the sequestering reagent.

If desired, a pre-made gel can be added to a contaminated solution, thus avoiding the need to manipulate the pH in order to precipitate the gel. This eliminates the need for the foregoing steps 1–3, and, of course, if recycling is not desired, steps 6–7 are not required either. In this mode, the gel is pre-made as a composition, and the composition is simply added to contaminated solutions wherein it adsorbs and absorbs various contaminants.

Acid side wash separations can likewise be treated with the phase transition gel. Typically, acid side wash processes are highly effective in removing metals such as Fe, Cd, Mn, and Ni. The acid wash solution can be added at step 1 above and the remaining steps are followed. By accelerating the gel through a contaminated acid wash solution (step 4) by centrifugation or other suitable means it is possible to avoid crystallization of the gel-forming agent.

Variations on the foregoing process are available. For example, there is no requirement that the receiving solution have pH>11. Both the receiving solution and the reagent could have pH<11. In other cases sluggish gel formation can be accelerated by taking measures to lower the pH of the combined solutions, for example, by bubbling carbon dioxide through the solutions. Or, aluminate and stabilizing agent could be premixed and stabilized as a gel and then added to a receiving solution in gel form.

THE PHASE TRANSITION GEL

The active components including the selected polydentate nitrogen bearing complexing agent and selected metal hydroxide or oxyhydroxide are stabilized as dissolved species in a NaOH solution (greater than 2.2 molar). The complexing agent is bidentate, tridentate, quadradentate, pentadentate, or hexadentate which allows for 2, 4, 5, or 6 co-ordination sites. The active species in the sequestering reagent solution co-precipitate as a gel by passing through a phase transition between 1.8 to 2.5 molar NaOH but with typical transitions at STP of 2.2 molar NaOH. This is a critical point: the gel has a phase transition property which allows it to be precipitated or dissolved by a simple adjustment to pH (which can be expressed in terms of hydroxide ion concentration).

Therefore, as the sequestering reagent is added to the filtered wash solution, its pH drops across the phase boundary resulting in the co-precipitation of the scavenging agents as a gel (equation 6 and FIG. 2). Metal hydroxides such as aluminum hydroxide form gels (FIG. 1) which are utilized in laboratories to scavenge contaminants. However, in prior art the hydroxide which is typically in an initial amorphous form converts to a range of crystalline forms which precipitate. The crystalline precipitates are difficult to dissolve. Co-precipitation of the metal hydroxide or oxy-hydroxide with a nitrogen polydentate complexing agent stabilizes the metal hydroxide in the amorphous form. Because the nitrogen polydentate complexing agents are also effective scavengers, their combination as a co-precipitated gel provides a more versatile sequestering reagent that is also readily redissolved, recovered, and recycled.

Many non-nitrogen bearing complexing agents such as oxalate and citrate perform poorly as a stabilizer at pH>11 since they dissociate as acids forcing a rapid drop in pH, and thus encourage unwanted crystallization of the metal hydroxide.

ENHANCE EXTRACTION OF CONTAMINANTS FROM SOLIDS

The Alexander Wash Reagent is preferred for the initial extractions from soils or surfaces being decontaminated since it can be designed to be chemically compatible with the Alexander Sequestering Reagent. Where practical, it is recommended that the polydentate nitrogen bearing complexing agent be used in both the wash solution and the wash reagent for compatibility, simplification of process control, and cost. In such cases, aluminum hydroxide, for example, could be added alone since the gel stabilizing agent would be available in the wash reagent.

A particular advantage of this invention is that it allows for the use of highly basic solutions in soil washing processes. This has the advantage of reducing corrosion of washing equipment which is an acute problem with acid-based washing solutions; and, it has the further advantage of permitting cheap nitrogen-containing compounds such as urea to substitute for expensive compounds such as EDTA as getters for metallic contaminants. At pH levels above 9 or so, many organic nitrogen-containing compounds which are bidentate, tridentate, quadradentate, pentadentate, or hexadentate coordination bonding can serve as getters for metallic contaminants. Among the compounds which are suitable are the following: amines, nitrogen heterocyclics, amides, hydroxyl amines, pyridazine, dialkyl amido complexes, hydrazines, pyrimidine, nitrene complexes, amino carboxylic acids, purine, nitrido complexes, amino phenols, pyrazene, urea and substituted ureas, azo complexes, diazene complexes, urea, and thiourea; and analogous phosphorous compounds.

A primary active agent used in extracting the contaminants from solids surfaces (e.g., soil particles, metals, or concrete) is sodium peroxide. This agent serves a dual purpose since it oxidizes multivalent species and provides the necessary hydroxide concentration for the process (pH>11). Polydentate nitrogen bearing complexing agents such as amines or amides, and anions such as carbonate and/or sulfate can be used to enhance the efficiency of recovery depending on the chemistry of the contaminated material. Influent groundwater compositions would be adjusted as necessary to an elevated pH greater than 11. Solution temperatures above 50° C. significantly enhance recovery. Ksp values for the metals to be extracted need to be compared to determine the solid phase which controls the solubility limit. If the phase is hydroxide as is typical then no further additions are required. However, if the limiting solid phase is carbonate or sulfate then their recovery can be further improved by adding them as dissolved species.

Carboxylic acids such as oxalate and citrate would be strong candidates for acid wash applications and are widely used as such.

In one useful soil washing application compatible with this invention, the active components, including a nitrogen-containing complexing agent, are stabilized in a solution comprising sodium peroxide. The pH is adjusted to be >11 but less than the value which permits hydroxide gels to dissolve. In this application, the nitrogen-containing complexing agent could be an amine such as guanidine, TEA, or urea. These are inexpensive, commercially available, biodegradable, safely handled, and highly effective. EDTA could also be used, but is more expensive and is not as effective as urea. To enhance the effectiveness of this soil washing solvent, selected anions such as carbonate and sulfate can be added, and the temperature can also be raised.

SEPARATION OF CONTAMINANTS FROM SOIL WASHING SOLUTIONS OR DECONTAMINATION SOLUTIONS

A scheme is here presented for separating contaminants from soil washing solutions. This scheme apply equally to the treatment of decontamination solutions recovered from the surfaces of metal or concrete components by use of an alkaline wash solution. The term "TRU" refers to transuranic elements, to which the below-described process is particularly applicable. The principal steps are as follows:

STEP 1: Wash soil or component to be decontaminated with an alkaline solution preferably Alexander Wash Reagent and recover filtrate. Adjust filtrate to greater than pH 11 if necessary.

STEP 2: Filter and/or centrifuge recovered sodium hydroxide filtrate (supernatant) which will have dissolved radionuclides and hazardous metals (influent stream).

STEP 3: Introduce the Alexander Sequestering Reagent at sufficient concentrations to scavenge metals from filtrate at the top or front end of the reactor vessel.

STEP 4: As necessary accelerate precipitation of the reagent solution by adding $CO_2$ or other acid to lower hydroxide ion concentration to less than one molar [OH] until the organo-metal hydroxide-complex is stabilized as a gel. $CO_2$ can be introduced in any of a number of methods including diffusers or carbonation towers.

STEP 5: Allow the gel complex to settle through the supernatant or accelerate its passage through use of centrifugation. The gel will scavenge TRUs and hazardous metals as it forms and settles. $CO_2$ will simultaneously force precipitation of carbonates.

STEP 6: Siphon supernatant off top of reactor vessel. Send supernatant out of processing or to Step 3 and repeat steps 3 to 6 as necessary to enhance recovery. The supernatant can be removed by a hydrocyclone or pumped from the carbonation tower.

STEP 7: TRU/hazardous metal gel plus sludge (including carbonates) will be left at bottom of reactor vessel. Concentrated TRUs and hazardous metals can be separated from the sludge by dissolving the gel with additional caustic solution just sufficient to redissolve the gel [equation 6, preferred embodiment]. For example, hydrocyclones can be used at this step to separate the concentrated contaminated NaOH solution from the solids precipitated as sludge.

STEP 8: Subsequently the two concentrated waste streams can be subjected to additional separations processing (See Appendix A).

SEPARATIONS OF CONTAMINANTS FROM GROUNDWATER AND CONTAMINATED SURFACE WATERS

The scheme provided above for separating contaminants from soil washing solutions can also be adapted for separation of contaminants from groundwater or surface water impoundments such as ponds, cribs, or basins. The principal steps involve:

STEP 1: Adjust recovered groundwater to greater than pH 11 as necessary, for example through various additions of NaOH, $Na_2O_2$, and $Na_2CO_3$.

STEP 2: Filter and/or centrifuge recovered pH adjusted contaminated groundwater.

STEP 3: Introduce metal organic complexant [Alexander sequestering reagent] at sufficient concentrations to scavenge metals from filtrate. Introduce Alexander sequestering reagent at surface of reactor vessel.

STEP 4: As necessary accelerate precipitation of the reagent solution by adding $CO_2$ or other acid to <1.0M hydroxide ion concentration or until the organo-metal hydroxide-complex is stabilized as a gel. $CO_2$ can be introduced in any of a number of methods including diffusers or carbonation towers.

STEP 5: Allow the gel complex to settle through the supernatant or accelerate its passage through use of centrifugation. The gel will scavenge TRUs and hazardous metals as it forms and settles. $CO_2$ will simultaneously force precipitation of carbonates.

STEP 6: Siphon supernatant off top of reactor vessel. Send supernatant out of processing or to Step 3 and repeat steps 3 to 6 as necessary to enhance recovery. The supernatant can be removed by a hydrocyclone or pumped from the carbonation tower.

STEP 7: TRU/hazardous metal gel plus sludge (including carbonates) will be left at bottom of reactor vessel. Concentrated TRUs and hazardous metals can be separated from the sludge by dissolving the gel with additional caustic solution just sufficient to redissolve the gel [equation 6, preferred embodiment]. For example, hydrocyclones can be used at this step to separate the concentrated contaminated NaOH solution from the solids precipitated as sludge.

STEP 8: Subsequently the two concentrated waste streams can be subjected to additional separations processing (See Appendix A).

EXAMPLES

The following examples are illustrative of the present invention:

Example 1

Aluminum hydroxide was precipitated by bubbling carbon dioxide through two sets of high level radioactive waste simulants, one as a blank and one spiked with 0.2 M/L of EDTA. The time for the phase change of the amorphous aluminum hydroxide to gibbsite occurred within several hours. This phase change occurred with the precipitation of the floating gelatinous aluminum hydroxide to a white crystalline powder at the bottom of the reaction vessel. When substantial quantities of carbon dioxide were used, the reaction became irreversible; i.e., the $Al(OH)_3$ precipitate remained as a precipitate. Further, when this precipitate was held at 110 degrees F. for prolonged periods it became insoluble, even in a large excess of NaOH, indicating that the transformation from the gel to the insoluble crystalline form, gibbsite, is difficult to reverse.

The same experiment was carried out using a high level waste simulant with a number of polydentate nitrogen bearing complexing agents. The aluminum hydroxide in the presence of these complexing agents did not transform into the crystalline gibbsite in time periods in excess of five weeks. By titrating the precipitates with and without complexing agents with NaOH, we found that the stabilized gel went back into solution between 2.2 to 2.5 M/L of NaOH.

Example 2

A set of soil column elution studies was conducted to evaluate the efficiency of potential constituents of the wash reagent. The experiments were designed such that an equivalent contaminant mixture was added to each of four columns. Four organics were tested including EDTA. The efficiencies of the three organics (HEDTA, TEA, and Urea) were compared to EDTA. The following results indicate that HEDTA, triethylamine and urea perform better than EDTA for selected contaminants. The following decontamination factors are for comparative purposes where EDTA is normalized to 100%:

|    | EDTA | HEDTA | TEA  | Urea |
|----|------|-------|------|------|
| Al | 100% | 169%  | 149% | 147% |
| Cr | 100% | 155%  | 187% | 175% |
| Cu | 100% | 97%   | 81%  | 103% |
| Ni | 100% | 78%   | 90%  | 75%  |
| Fe | 100% | 132%  | 349% | 119% |

It appears that in many applications urea, TEA, and guanadine which are substantially cheaper than EDTA, biodegradable, safe to handle, chemically compatible in many wash systems, and readily available, are more effective than EDTA. Depending on application, the constituents of the Alexander Wash Reagent should be optimized. In the application to our contaminated soil samples the results were dramatic.

Because complexing agents are also effective scavengers, their combination with the metal hydroxide into a co-precipitated gel provides a versatile system for sequestering contaminants into a precipitating gel, which gel is also one that is readily redissolved, recovered, and recycled—unlike precipitated metallic hydroxide crystalline precipitates.

Target organic or metallic components may be extracted from a caustic solution containing a gel-former, such as aluminate ion, and a gel-stabilizing agent, such as the EDTA anion, by taking measures to lower the pH of the solution. This causes the precipitation of aluminum hydroxide gel and the sequestering of the target organic or metallic components. The gel-stabilizing agent prevents the aluminum hydroxide from crystallizing as pH is lowered, and encourages formation of a stable gel. The gel-stabilizing agent is a nitrogen-containing compound such as EDTA or urea that forms coordination bonds with the aluminum in competition with hydroxide. This inhibits competing crystallization processes and thus stabilizes the gel. The stabilized gel is readily redissolved by increasing the pH, thus allowing for easy separation of the waste load and recycling of the gel-former and gel-stabilizing compounds.

Chelating agents which can act as acids, especially those such as the carboxylic acids, are not effective gel-stabilizing agents. Such agents cause a rapid drop in pH which in turn triggers the unwanted crystallization of the aluminum hydroxide. Two representative compounds in this category which are widely used as chelating agents include citrate and oxalate. They are best suited for lower pH acid wash applications of this process.

This invention is a separations process, especially well suited for but not restricted to the recovery of contaminants from highly caustic hydroxide solutions (>pH 11). The source of the solutions to be cleaned by the process may be from a wide range of contaminant recovery processes. The contaminant bearing solutions may be recovered from diverse sources such as soils, waste by-products, groundwaters, and facility components including metals and concretes. The solutions may also be from solution mining in which case the process is applied to the extraction of the resource. The contaminant bearing solutions may also be from processing stages of liquid high level waste treatment streams. Target contaminants include: radionuclides, especially actinides, transuranics, and some fission products (e.g., Tc); processing organics such as aldehydes, ketones, phenols, aromatic nitro compounds, carboxylic acids, and amino compounds; and heavy metals, especially amphiprotic hydroxides and their anions (principally of Zn, Al, Cr, Pb, Sn, As, Sb, Cu, Se, Te, Cd, V, Mn, Co, and Cs).

APPENDIX A
SEPARATION SCHEMES

Added acid to solution to form precipitate.

| Residue: Examined for lead | Solution: Hydrogen peroxide added, acidity adjusted to approx 0.5N, heated to boiling, hydrogen sulfide gas passed under pressure, digested and centrifuged | | | |
|---|---|---|---|---|
| | Separated Copper | Solution: Boiled off hydrogen sulfide, metal ions oxidized, ammonium chloride added, neutralized acid, boiled solution and centrifuged | | |
| | | Investigated residue for iron, Chromium, and Aluminum | Solution: Passed hydrogen sulfide through the solution to complete precipitation | |
| | | | Examined residue for Nickel, Manganese and Zinc | Solution: Neutralized with acid and evaporated to dryness. Heated to remove ammonium salts. Cooled and dissolved residue in acid. Added acid in excess, and then reagent to precipitate ions. Digested and centrifuged. |
| | | | | Residue: Examined for Barium, Strontium and Calcium / Solution: Examined for Magnesium and Alkali Metals |

Lead Group Separation:

| Added acid to complete precipitation. Heated, cooled and centrifuged. |  |
|---|---|
| Residue: Added water, boiled and centrifuged. | |
| Centrifuge: | |
| Separated Lead | Saved for Palladium Separation |

Iron Group Separation:

| Evaporated solution to half bulk, boiled off disolved hydrogen sulfide, oxidized iron. Added excess sat. ammonium chloride and aqueous ammonia. Shaked and centrifuged. Washed precipitate and centrifuged | | |
|---|---|---|
| Residue: Suspended in water. Combined sodium carbonate, boiled for a few minutes and centrifuged | | Centrifugate: Proceeded to Zinc Group |
| Residue: Separated Iron | Centrifugate: Removed chromium | |

Palladium Separation:

| Added reagents to lead group centrifugates. Heated and centrifuged. Washed residue and combined washings to centrifugate. |
|---|
| Residue: Acidified, boiled and centrifuged |
| Centrifugate: Acidified, boiled and centrifuged. |
| Centrifugate: Added reagent, acidified and centrifuged. |
| Residue: Separated Palladium. |

Zinc Group Separation:

| Completed precipitation from iron group centrifugate. | | |
|---|---|---|
| Residue: Acidified and stired with water. Centrifuged. | | |
| Residue: Acidified, then transferred to crucible and beaker. Added potassium chlorinate. Boiled and evaporated to dryness. Dissolved in water and divided. | Centrifugate: Boiled off hydrogen sulfide. Added base in slight excess. Centrifuged. | |
| | Residue: Separated Manganese | Centrifugate: Separated Zinc |
| Separated Cobalt / Separated Nickel | | |

APPENDIX A
SEPARATION SCHEMES

Calcium Group Separation:

Neutralized centrifugate from zinc group and evaporated to dryness. Heated to remove ammonium salts. Precipitate dissolved in acid, was neutralized, digested and centrifuged.

| Residue was dissolved and centrifuged | | Examined centrifugate for Magnesium and Cesium |
|---|---|---|
| Separated Barium | Separated Strontium and Calcium | |

Magnesium and Cesium Separation:

Evaporated calcium group centrifugate to dryness, acidified and reevaporated. Substance was then ignited and extracted with water.

| Separated Magnesium | Cesium separated by electrode deposition. |
|---|---|

Lanthanum, Neodymium, Uranium, Vanadium and Zirconium Separation:

Boiled off hydrogen sulfide from copper separation centrugate. Added ferrous chloride and ammonium chloride, heated and diluted with reagent. Centrifuged, washed residue and added washings to centrifugate.

Residue: Dissolved in dilute acid, added oxalic acid crystals, digested and centrifuged.

Centrifugate: neutralized with reagent and digested. Centrifuged and washed residue with ammonium chloride. Added reagent and boiled till effervescence ceased. Centrifuged, washed and residue and combined washings with centrifugate.

| Residue: Separated Zirconium and Lanthanum | Centrifugate: Acidified and added reagents. Stirred and centrifuged. | |
|---|---|---|
| | Residue: Separated Vanadium, Neodymium | Centrifugate: Acidified and passed hydrogen sulfide. Centrifuged and transferred solution to boiling tube. Boiled to expell hydrogen sulfide. Cooled and added reagent. Boiled and centrifuged. |
| | | Centrifugate: Separated Uranium. |

What is claimed is:

1. A method for extracting materials from a solution comprising the steps of contacting said solution with a gel-forming agent; contacting said solution with a gel-stabilizing agent; adjusting the pH of said solution such that said gel-forming and said gel stabilizing agents form an organic metal-hydroxy complex; separating said complex from said solution; and dissolving said complex to regenerate said gel-forming and said gel-stabilizing agents.

2. The method of claim 1 wherein said gel-forming agent is selected from the group consisting of: aluminum hydroxide; scandium hydroxide; yttrium hydroxide; lanthanum hydroxide; gallium hydroxide; indium hydroxide; and thallium hydroxide.

3. The method of claim 1 wherein said gel-stabilizing agent is a polydentate nitrogen bearing complexing agent selected from the following group: EDTA, amines, nitrogen heterocyclics, amides, hydroxyl amines, pyridazine, dialkyl amido complexes, hydrazines, pyrimidine, nitrene complexes, amino carboxylic acids, purine, nitrido complexes, amino phenols, pyrazene, urea and substituted ureas, azo complexes, diazene complexes, and thiourea.

4. The method of claim 1 wherein said gel-forming agent is aluminum hydroxide and said gel-stabilizing agent is EDTA.

5. The method of claim 1 wherein dissolving said complex is accomplished by sufficiently increasing the pH of said solution.

* * * * *